United States Patent
Ketkar et al.

(10) Patent No.: US 8,977,510 B2
(45) Date of Patent: Mar. 10, 2015

(54) SYSTEM AND METHOD FOR DETERMINING CHARGING AND DISCHARGING POWER LEVELS FOR A BATTERY PACK

(75) Inventors: Satish Ketkar, Troy, MI (US); Thomas J. Gadawski, Shelby Township, MI (US); Mike Nielson, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 480 days.

(21) Appl. No.: 13/327,103

(22) Filed: Dec. 15, 2011

(65) Prior Publication Data

US 2013/0158913 A1 Jun. 20, 2013

(51) Int. Cl.
  *B60L 11/18* (2006.01)

(52) U.S. Cl.
  CPC ........... *B60L 11/187* (2013.01); *B60L 11/1872* (2013.01); *B60L 11/1875* (2013.01); *B60L 11/1874* (2013.01)
  USPC ....................................................... 702/63

(58) Field of Classification Search
  CPC .. G01R 31/36; G01R 31/3658; B60L 11/187; B60L 11/1872; B60L 11/1874; B60L 11/1875
  USPC ....................................................... 702/63
  See application file for complete search history.

(56) References Cited

U.S. PATENT DOCUMENTS

| | | | |
|---|---|---|---|
| 5,834,132 A * | 11/1998 | Hasegawa et al. | 429/62 |
| 7,321,220 B2 | 1/2008 | Plett | |
| 7,589,501 B2 | 9/2009 | Chang et al. | |
| 7,656,122 B2 | 2/2010 | Plett | |
| 7,969,120 B2 | 6/2011 | Plett | |
| 2003/0042866 A1* | 3/2003 | Minamiura et al. | 320/104 |
| 2003/0118891 A1* | 6/2003 | Saito et al. | 429/62 |
| 2005/0074048 A1* | 4/2005 | Wu et al. | 374/4 |
| 2008/0048608 A1* | 2/2008 | Lim et al. | 320/106 |
| 2008/0280192 A1* | 11/2008 | Drozdz et al. | 429/62 |
| 2008/0311466 A1* | 12/2008 | Yang et al. | 429/62 |
| 2009/0325053 A1* | 12/2009 | Koetting et al. | 429/120 |
| 2012/0295141 A1* | 11/2012 | Allen | 429/62 |

FOREIGN PATENT DOCUMENTS

| JP | H10106638 A | 4/1998 |
|---|---|---|
| JP | 2002171685 A | 6/2002 |
| JP | 2003323178 A | 11/2003 |

OTHER PUBLICATIONS

Journal of Power Sources, Wong et al. published 2008.*

* cited by examiner

*Primary Examiner* — Jonathan C Teixeira Moffat
*Assistant Examiner* — Lynda Dinh
(74) *Attorney, Agent, or Firm* — Buckert Patent & Trademark Law Firm, PC; John F. Buckert

(57) ABSTRACT

A system and a method for determining charging and discharging power levels for a battery pack are provided. The battery pack has an enclosure holding a battery module therein. The system includes a computer that determines a temperature correlation value based on first and second temperature values associated with the battery pack. The computer determines a third temperature value indicative of a temperature level of a first battery cell disposed adjacent to the end of a housing in the battery pack based on the first temperature value and the temperature correlation value. The computer determines a desired charging power level for the battery pack based on the third temperature value.

12 Claims, 6 Drawing Sheets

SYSTEM AND METHOD FOR DETERMINING CHARGING AND DISCHARGING POWER LEVELS FOR A BATTERY PACK

BACKGROUND

Battery packs have battery modules that have been cooled utilizing a coolant. The inventors herein have recognized that a battery cell within an end battery module at an end of the battery pack can have a temperature less than other battery cells within the battery module. Further, the inventors herein have recognized that a temperature sensor within a central region of a battery module may not accurately determine a temperature of the battery cell at the end of the battery module at the end of the battery pack. Further, the inventors herein have recognized that a battery pack system may determine an amount of electrical power to discharge from the battery pack based on the temperature level at a central region of the battery module even though the end battery cell which is at a lower temperature level may not be able to output a requested amount of electrical power.

The inventors herein have recognized a need for an improved system and method for determining charging and discharging power levels of a battery pack.

SUMMARY

A system for determining charging and discharging power levels for a battery pack in accordance with an exemplary embodiment is provided. The battery pack has an enclosure holding a battery module therein. The battery module has a housing, and first, second, and third battery cells disposed in the housing. The first battery cell is disposed adjacent to an end of the housing and between the end of the housing and the second battery cell. The second battery cell is disposed between the first battery cell and the third battery cell. The system includes a first temperature sensor disposed between the second and third battery cells. The first temperature sensor is configured to generate a first temperature signal indicative of a first temperature level of the second battery cell. The system further includes a second temperature sensor configured to generate a second temperature signal indicative of a second temperature level of a cooling medium flowing into the enclosure. The system further includes a computer configured to determine first and second temperature values corresponding to the first and second temperature levels, respectively, based on the first and second temperature signals, respectively. The computer is further configured to determine a temperature correlation value based on the first and second temperature values. The computer is further configured to determine a third temperature value indicative of a temperature level of the first battery cell disposed adjacent to the end of the housing based on the first temperature value and the temperature correlation value. The computer is further configured to determine a desired charging power level for the battery pack based on the third temperature value.

A method for determining charging and discharging power levels for a battery pack in accordance with another exemplary embodiment is provided. The battery pack has an enclosure holding a battery module therein. The battery module has a housing, and first, second, and third battery cells disposed in the housing. The first battery cell is disposed adjacent to an end of the housing and between the end of the housing and the second battery cell. The second battery cell is disposed between the first battery cell and the third battery cell. The method includes generating a first temperature signal indicative of a first temperature level of the second battery cell utilizing a first temperature sensor disposed between the second and third battery cells. The method further includes generating a second temperature signal indicative of a second temperature level of cooling medium flowing into the enclosure utilizing a second temperature sensor. The method further includes determining first and second temperature values corresponding to the first and second temperature levels, respectively, based on the first and second temperature signals, respectively, utilizing a computer. The method further includes determining a temperature correlation value based on the first and second temperature values, utilizing the computer. The method further includes determining a third temperature value indicative of a temperature level of the first battery cell disposed adjacent to the end of the housing based on the first temperature value and the temperature correlation value, utilizing the computer. The method further includes determining a desired charging power level for the battery pack based on the third temperature value and storing the desired charging power level in a memory device, utilizing the computer.

DETAILED DESCRIPTION

Figure 1:
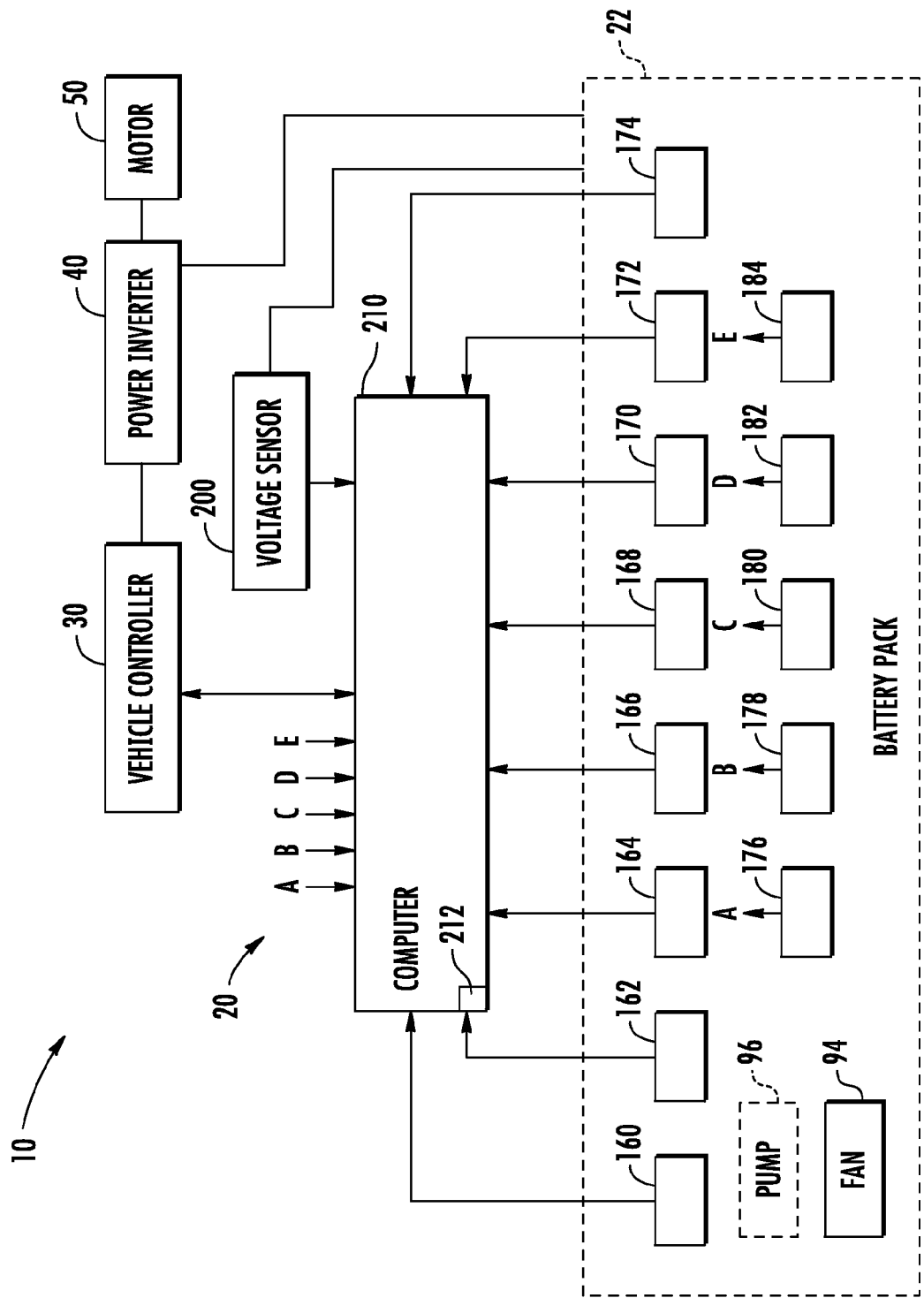
FIG. 1 is a block diagram of a system for determining charging and discharging power levels for a battery pack in accordance with an exemplary embodiment.

Referring to FIG. 1, a vehicle 10 having a system 20 for determining charging and discharging power levels for a battery pack 22, in accordance with an exemplary embodiment is provided. The vehicle 10 includes the battery pack 22, a vehicle controller 30, a power inverter 40, and a motor 50.

Figure 2:
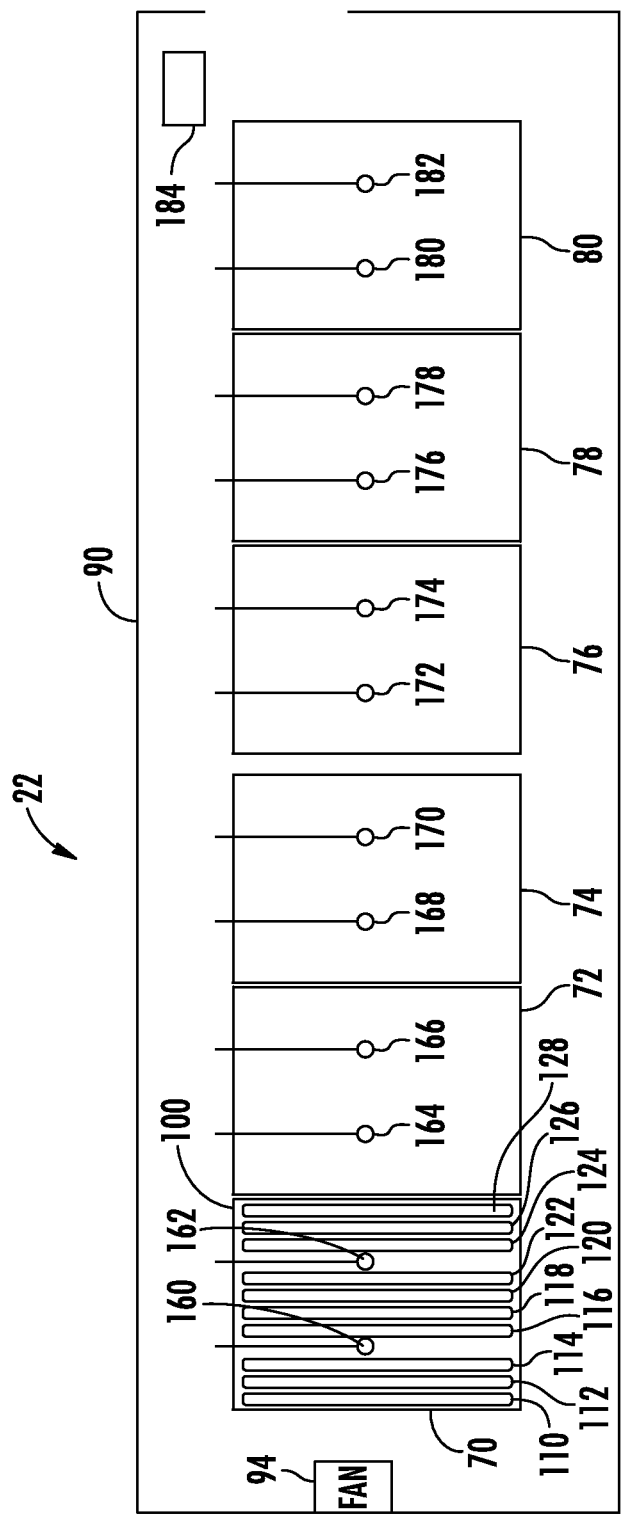
FIG. 2 is a simplified block diagram of a battery pack.

Referring to FIGS. 1 and 2, the battery pack 22 includes battery modules 70, 72, 74, 76, 78, 80, an enclosure 90, and a fan 94. The battery modules 70-80 and the fan 94 are disposed within the enclosure 90. When the fan 94 is turned on utilizing a control signal from a computer 210, the fan 94 moves a cooling medium, such as air for example, throughout the interior of the enclosure 94 for cooling the battery modules 70-80. In an alternative embodiment, the fan 94 can be replaced with a pump 96 which pumps a cooling medium, such as a fluid or a refrigerant, through a portion of an interior of the enclosure 94 for cooling the battery modules 70-80. The battery modules 70-80 have a similar structure to one another and therefore only the battery module 70 will be discussed in greater detail hereinafter. For purposes of simplicity, the battery cells within the battery modules 72, 74, 76, 78, 80 are not shown.

The battery module 70 includes a housing 100 and battery cells 110, 112, 114, 116, 118, 120, 122, 124, 126, 128 disposed within the housing 100. In one exemplary embodiment, the battery cells 110-128 are pouch-type lithium-ion battery cells. Of course, in alternative embodiments, other types of battery cells are contemplated.

The system 20 is configured to determine a desired charging power level and a desired discharging power level for the battery pack 22. The system 20 includes temperature sensors 160, 162, 164, 166, 168, 170, 172, 174, 176, 178, 180, 182, 184, a voltage sensor 200, and a computer 210. As will be explained in greater detail below, the temperature of the battery cell 110 will be utilized to determine the desired charging power level and the desired discharging power level for the battery pack 22.

The temperature sensors 160, 162 are disposed within central regions of the battery module 70. The temperature sensor 160 is disposed between battery cells 114, 116, and generates a temperature signal indicative of a temperature level of the battery cells 114, 116, that is received by the computer 210. The temperature sensor 162 is disposed between battery cells 122, 124, and generates a temperature signal indicative of a temperature level of the battery cells 122, 124, that is received by the computer 210.

The temperature sensors 164, 166 are disposed within central regions of the battery module 72. The temperature sensor 164 is disposed between a pair of battery cells (not shown) within the battery module 72, and generates a temperature signal indicative of a temperature level of the pair of battery cells, that is received by the computer 210. The temperature sensor 166 is disposed between another pair of battery cells (not shown) within the battery module 72, and generates a temperature signal indicative of a temperature level of the pair of battery cells, that is received by the computer 210.

The temperature sensors 168, 170 are disposed within central regions of the battery module 74. The temperature sensor 168 is disposed between a pair of battery cells (not shown) within the battery module 74, and generates a temperature signal indicative of a temperature level of the pair of battery cells, that is received by the computer 210. The temperature sensor 170 is disposed between another pair of battery cells (not shown) within the battery module 74, and generates a temperature signal indicative of a temperature level of the pair of battery cells, that is received by the computer 210.

The temperature sensors 172, 174 are disposed within central regions of the battery module 76. The temperature sensor 172 is disposed between a pair of battery cells (not shown) within the battery module 76, and generates a temperature signal indicative of a temperature level of the pair of battery cells, that is received by the computer 210. The temperature sensor 174 is disposed between another pair of battery cells (not shown) within the battery module 76, and generates a temperature signal indicative of a temperature level of the pair of battery cells, that is received by the computer 210.

The temperature sensors 176, 178 are disposed within central regions of the battery module 78. The temperature sensor 176 is disposed between a pair of battery cells (not shown) within the battery module 78, and generates a temperature signal indicative of a temperature level of the pair of battery cells, that is received by the computer 210. The temperature sensor 178 is disposed between another pair of battery cells (not shown) within the battery module 78, and generates a temperature signal indicative of a temperature level of the pair of battery cells, that is received by the computer 210.

The temperature sensors 180, 182 are disposed within central regions of the battery module 80. The temperature sensor 180 is disposed between a pair of battery cells (not shown) within the battery module 80, and generates a temperature signal indicative of a temperature level of the pair of battery cells, that is received by the computer 210. The temperature sensor 182 is disposed between another pair of battery cells (not shown) within the battery module 80, and generates a temperature signal indicative of a temperature level of the pair of battery cells, that is received by the computer 210.

The voltage sensor 200 is configured to generate a voltage signal indicative of a voltage level output by the battery pack 22. The computer 20 is configured to receive the voltage signal from the voltage sensor 200, and is further configured to calculate a state of charge of the battery pack 22 based upon the voltage signal.

The computer 210 is operably coupled to the temperature sensors 160-184, the fan 94, the voltage sensor 200, and the vehicle controller 30. In an alternative embodiment, the computer 210 is operably coupled to the pump 96 instead of the fan 94, for controlling operation of the pump 96. The computer 210 has an internal memory device 212 for storing executable software instructions and associated data for implementing the methods that will be explained in greater detail below. In one exemplary embodiment, the computer 210 comprises a microprocessor operably coupled to the memory device 212. Of course, in alternative embodiments, the computer 210 could comprise a programmable logic controller or a field programmable logic array.

Referring to FIG. 1, the vehicle controller 30 is configured to receive control signals from the computer 210 indicative of a desired charging power level and a desired discharging power level. If the vehicle controller 30 determines that the battery pack 22 is to be charged, the vehicle controller 30 generates a control signal to induce the power inverter 40 to charge the battery pack 22 at the desired charging power level. Alternatively, if the vehicle controller 30 determines that the battery pack 22 is to be discharged, the vehicle controller 30 generates another control signal to induce the power inverter 42 to discharge the battery pack 22 at the desired discharging power level, for energizing the motor 50 operably coupled to the power inverter 40.

Figure 3:
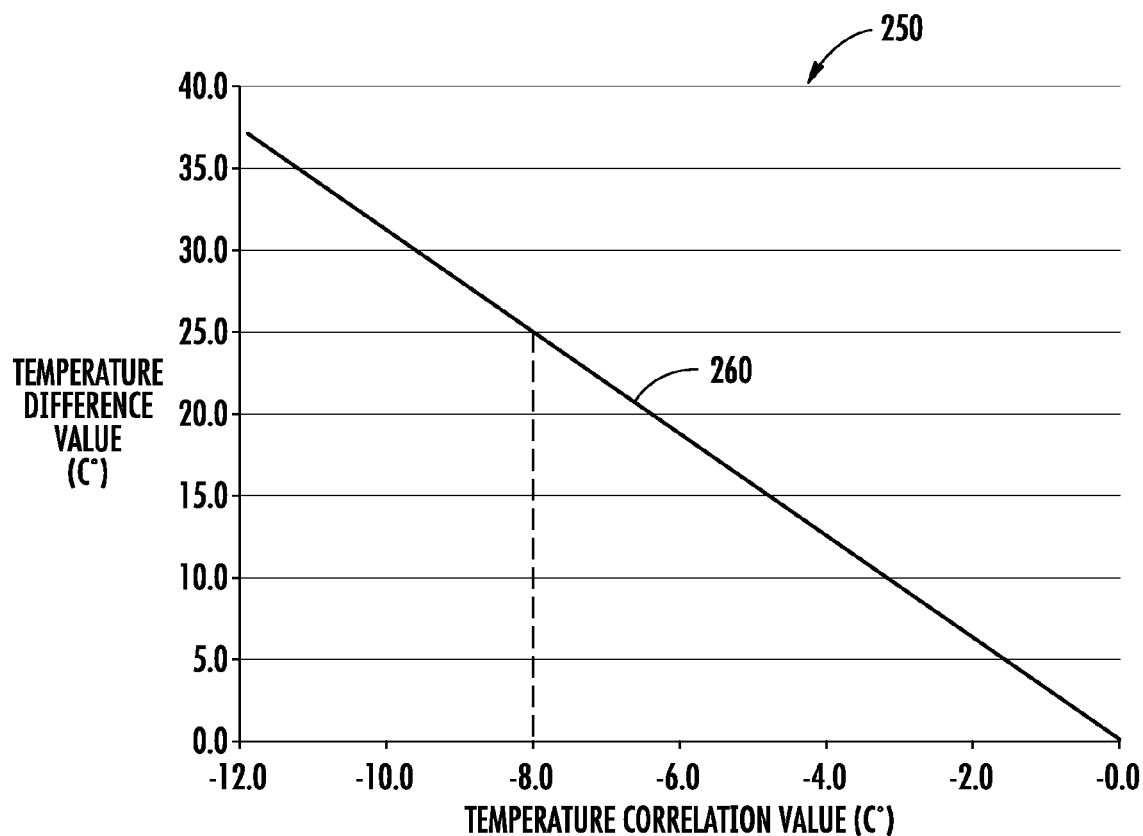
FIG. 3 is a graph illustrating a correlation curve showing a relationship between a temperature difference between a temperature of a cooling medium and a temperature of an end battery cell, and associated temperature correlation values.

Referring to FIGS. 2 and 3, a brief explanation of the methodology for determining an estimated temperature level of a battery cell 110 utilizing the temperature sensor 160 will now be explained. As shown, the temperature sensor 160 is disposed away from the battery cell 110 and cannot directly measure the temperature level of the battery cell 110. The inventors herein have recognized that it is desirable to determine the temperature level the battery cell 110 because the battery cell 110 is disposed at an end of the battery module 70 and is most likely to have a temperature level that is a lowest temperature level of the battery cells in the battery modules 70-80. Also, the inventors herein have recognized that the desired charging power level and the desired discharging power level should be based upon the lowest temperature level of the battery cells (e.g., the temperature level of the battery cell 110). Thus, the inventors herein have determined a methodology for estimating the temperature level of the battery cell 110.

The graph 250 has a Y-axis having difference values representing a difference between: (i) a temperature level determined from the temperature signal from temperature sensor 160, and (ii) a temperature level of cooling medium flowing into the enclosure (determined from the temperature signal from the temperature sensor 184). The graph 250 has an X-axis having temperature correlation values. The curve 260 represents a relationship between the temperature difference values of the Y-axis and the correlation values of the X-axis.

An exemplary methodology for determining an exemplary temperature level of the battery cell 110 utilizing the graph 250 will now be explained. If the difference value is equal to 25° Celcius, the graph 250 indicates that the associated temperature correlation value is −8° Celcius. If the temperature level of battery cell 114 is 20° Celcius, the temperature of the battery cell 110 could be determined by adding 20° Celcius to −8° Celcius, which equals 12° Celcius. Thus, in this example, the battery cell 110 has an estimated temperature level of 12° Celcius.

Figure 4:
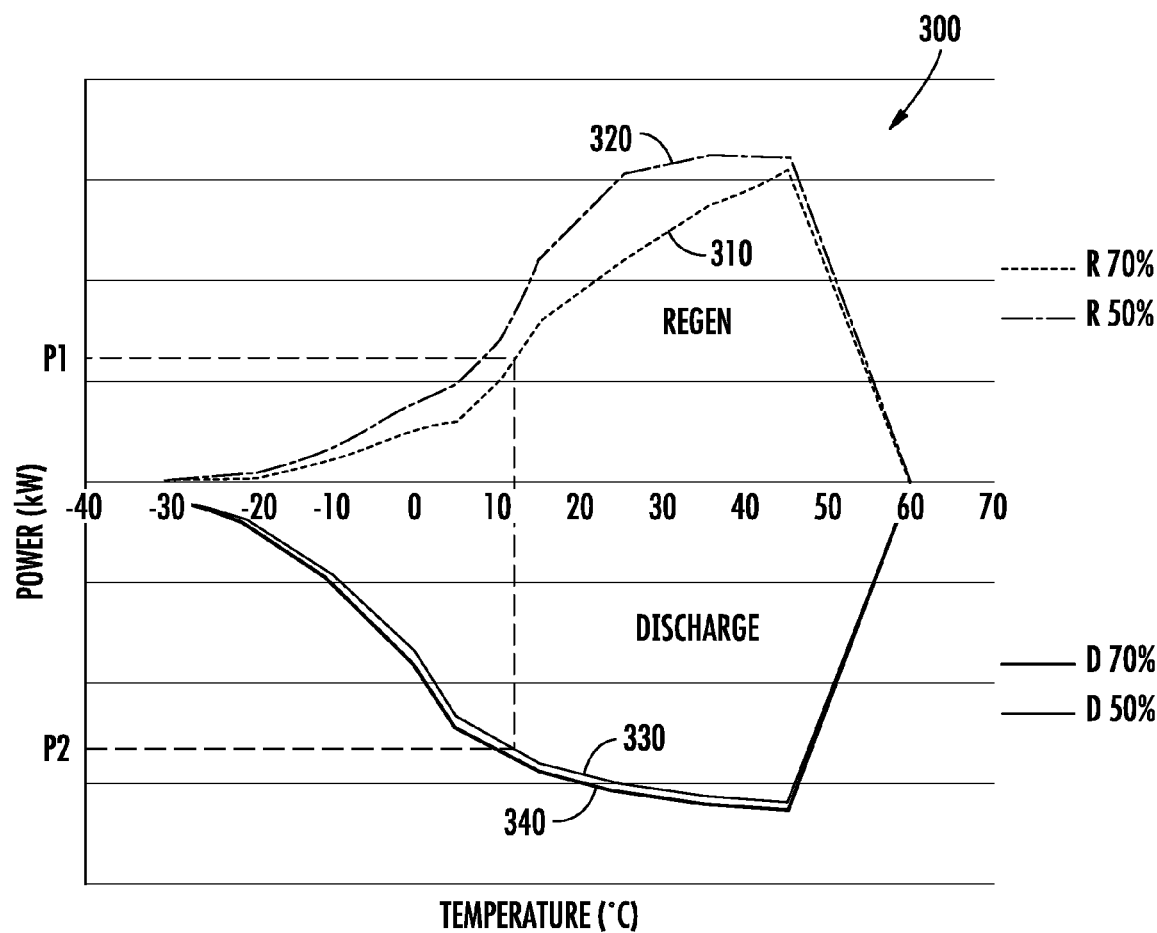
FIG. 4 is a graph showing charging power level curves and discharging power level curves as a function of a temperature of an end battery cell and a state of charge of the battery cell.

Referring to FIG. 4, a brief explanation of the methodology for determining a desired charging power level and a desired discharging power level will now be explained. As shown, a graph 300 has a Y-axis indicating power levels and an X-axis indicating temperature levels. The graph 300 includes charging power level curves 310, 320, and discharging power level curves 330, 340.

The charging level curve 310 is associated with a state-of-charge of the battery pack 22 of 70% of a maximum state-of-charge. The charging level curve 310 is associated with a state-of-charge of the battery pack 22 of 50% of a maximum state-of-charge. The charging level curves 310, 320 can be utilized to determine a desired charging power level. For example, if the battery cell 110 has a temperature level of 12° Celcius, and a state-of-charge of 70% of a maximum state of charge, the desired charging power level is represented by the value P1.

The discharging level curve 330 is associated with a state-of-charge of the battery pack 22 of 50% of a maximum state-of-charge. The discharging level curve 340 is associated with a state-of-charge of the battery pack 22 of 70% of a maximum state-of-charge. The charging level curves 330, 340 can be utilized to determine a desired discharging power level. For example, if the battery cell 110 has a temperature level of 12° Celcius, and a state-of-charge of 50% of a maximum state-of-charge, the desired discharging power level is represented by the value P2.

Figure 5:
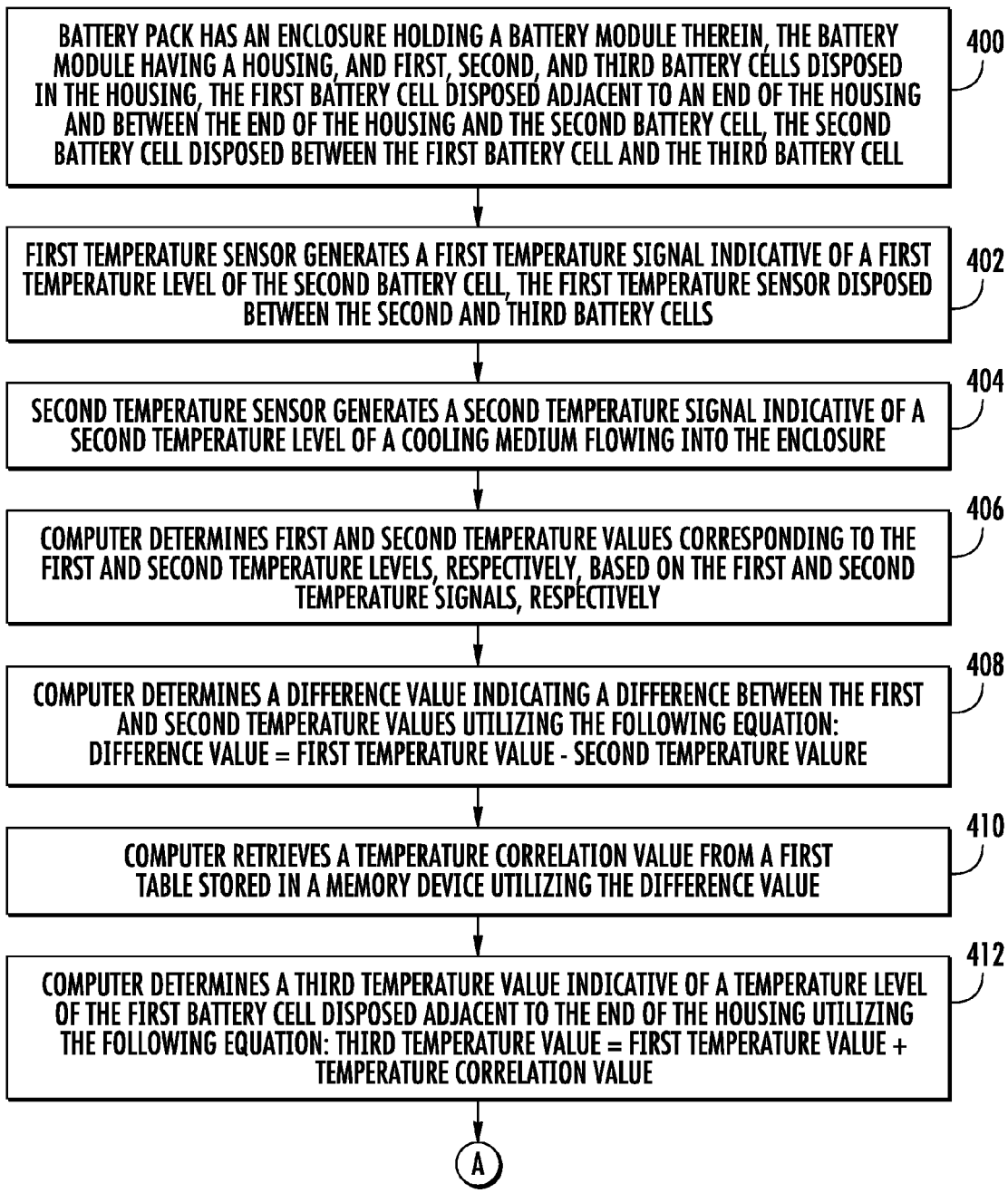
FIGS. 5 and 6 are flowcharts of a method for determining charging and discharging power levels for a battery pack in accordance with another exemplary embodiment.
Figure 6:
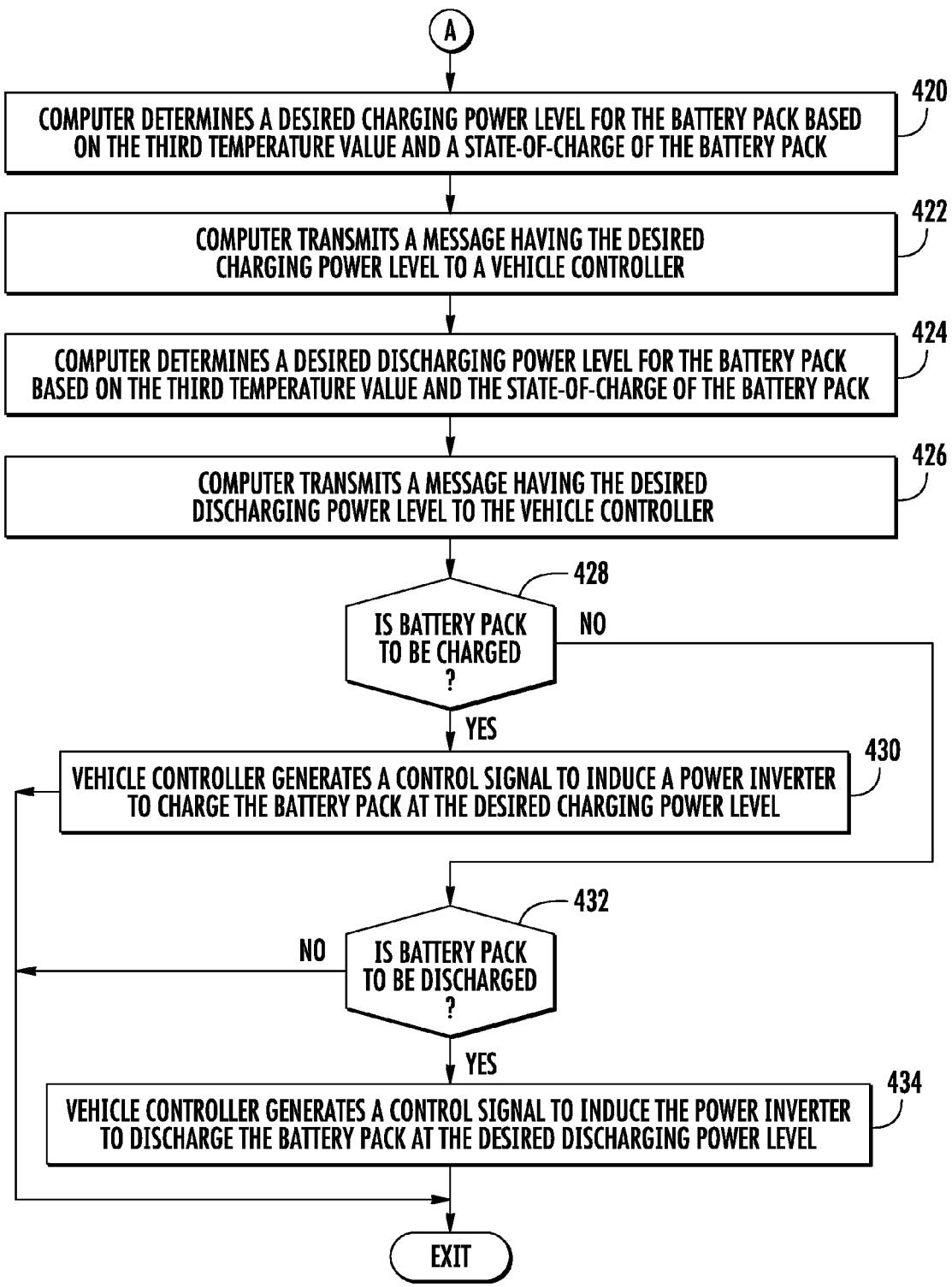

Referring to FIGS. 5 and 6, a flowchart of a method for determining a desired charging power level and a desired discharging power level for the battery pack 22 in accordance with another exemplary embodiment will be explained.

At step 400, the battery pack 22 has the enclosure 90 holding the battery module 70 therein. The battery module has the housing 100, and first, second, and third battery cells 110, 114, 116 disposed in the housing 100. The first battery cell 110 is disposed adjacent to an end of the housing 100 and between the end of the housing 100 and the second battery cell 114. The second battery cell 114 is disposed between the first battery cell 110 and the third battery cell 116.

At step 402, the first temperature sensor 160 generates a first temperature signal indicative of a first temperature level of the second battery cell 114. The first temperature sensor 160 is disposed between the second and third battery cells 114, 116.

At step 404, the second temperature sensor 184 generates a second temperature signal indicative of a second temperature level of a cooling medium flowing into the enclosure 90.

At step 406, the computer 210 determines first and second temperature values corresponding to the first and second temperature levels, respectively, based on the first and second temperature signals, respectively.

At step 408, the computer 210 determines a difference value indicating a difference between the first and second temperature values utilizing the following equation: difference value=first temperature value−second temperature value.

At step 410, the computer 210 retrieves a temperature correlation value from a first table stored in a memory device 212 utilizing the difference value. In particular, the first table corresponds to a software table representing the graph 250.

At step 412, the computer 210 determines a third temperature value indicative of a temperature level of the first battery cell 110 disposed adjacent to the end of the housing 100 utilizing the following equation: third temperature value=first temperature value+temperature correlation value.

At step 420, the computer 210 determines a desired charging power level for the battery pack 22 based on the third temperature value and a state-of-charge of the battery pack 22. In particular, the computer 210 can access a second table stored in the memory device 212 having data corresponding to the graph 300 to determine the desired charging power level based on the third temperature value and a state-of-charge of the battery pack 22.

At step 422, the computer 210 transmits a message having the desired charging power level to the vehicle controller 30.

At step 424, the computer 210 determines a desired discharging power level for the battery pack 22 based on the third temperature value and a state-of-charge of the battery pack 22. In particular, the computer 210 can access a second table stored in the memory device 212 having data corresponding to the graph 300 to determine the desired discharging power level based on the third temperature value and a state-of-charge of the battery pack 22.

At step 426, the computer 210 transmits a message having the desired discharging power level to the vehicle controller 30.

At step 428, the vehicle controller 30 makes a determination as to whether the battery pack 22 is to be charged. If the value of step 448 equals "yes", the method advances to step 430. Otherwise, the method advances to step 432.

At step 430, the vehicle controller 30 generates a control signal to induce a power inverter 40 to charge the battery pack 22 at the desired charging power level. After step 430, the method is exited.

Referring again to step 428, if the value of step 428 equals "no", the method advances step 432. At step 432, the vehicle controller 30 makes a determination as to whether the battery pack 22 is to be discharged. If the value of step 432 equals "yes", the method advances to step 434. Otherwise, the method is exited.

At step 434, the vehicle controller 30 generates a control signal to induce the power inverter 40 to discharge the battery pack 22 at the desired discharging power level. After step 434, the method is exited.

The system 10 and the method for determining a desired charging power level and a desired discharging power level provide a substantial advantage over other systems and methods. In particular, the system 10 and the method utilizes a correlation value to determine an accurate temperature level of an end battery cell of the battery pack, and then determines either a desired charging power level or desired discharging power level based upon the temperature level of the end battery cell.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A system for determining charging and discharging power levels for a battery pack, the battery pack having an enclosure holding a battery module therein, the battery module having a housing, and first, second, third battery cells disposed in the housing, the first battery cell disposed adjacent to an end of the housing and between the end of the housing and the second battery cell, the second battery cell disposed between the first battery cell and the third battery cell, the system comprising:
- a first temperature sensor disposed between the second and third battery cells, the first temperature sensor configured to generate a first temperature signal indicative of a first temperature level of the second battery cell;
- a second temperature sensor configured to generate a second temperature signal indicative of a second temperature level of a cooling medium flowing into the enclosure of the battery pack;
- a computer programmed to determine first and second temperature values corresponding to the first and second temperature levels, respectively, based on the first and second temperature signals, respectively;
- the computer further programmed to determine a first difference value indicating a difference between the first and second temperature values;
- the computer further programmed to select a first temperature correlation value from a table stored in a memory device utilizing the first difference value, the table having a plurality of difference values and a plurality of temperature correlation values, each difference value of the plurality of difference values being associated with a corresponding temperature correlation value of the plurality of temperature correlation values;
- the computer further programmed to determine a third temperature value indicative of a temperature level of the first battery cell disposed adjacent to the end of the housing of the battery module based on the first temperature value and the first temperature correlation value; and
- the computer further programmed to determine a desired charging power level for the battery pack based on the third temperature value indicative of the temperature level of the first battery cell disposed adjacent to the end of the housing of the battery module.

2. The system of claim 1, wherein the computer is further programmed to transmit a message to a vehicle controller indicating the desired charging power level.

3. The system of claim 1, wherein the computer is further programmed to determine a desired discharging power level for the battery pack based on the third temperature value.

4. The system of claim 3, wherein the computer is further programmed to transmit a message to a vehicle controller indicating the desired discharging power level.

5. The system of claim 1, wherein the computer is programmed to determine the third temperature value by adding the first temperature value to the first temperature correlation value.

6. The system of claim 1, wherein the second temperature sensor is disposed proximate to an inlet port of the enclosure.

7. A method for determining charging and discharging power levels for a battery pack, the battery pack having an enclosure holding a battery module therein, the battery module having a housing, and first, second, third battery cells disposed in the housing, the first battery cell disposed adjacent to an end of the housing and between the end of the housing and the second battery cell, the second battery cell disposed between the first battery cell and the third battery cell, the method comprising:
- generating a first temperature signal indicative of a first temperature level of the second battery cell utilizing a first temperature sensor disposed between the second and third battery cells in the housing of the battery module;
- generating a second temperature signal indicative of a second temperature level of a cooling medium flowing into the enclosure of the battery pack utilizing a second temperature sensor;
- determining first and second temperature values corresponding to the first and second temperature levels, respectively, based on the first and second temperature signals, respectively, utilizing a computer;
- determining a first difference value indicating a difference between the first and second temperature values, utilizing the computer;
- selecting a first temperature correlation value from a table utilizing the first difference value, utilizing the computer; the table having a plurality of difference values and a plurality of temperature correlation values, each difference value of the plurality of difference values being associated with a corresponding temperature correlation value of the plurality of temperature correlation values;
- determining a third temperature value indicative of a temperature level of the first battery cell disposed adjacent to the end of the housing of the battery module based on the first temperature value and the first temperature correlation value, utilizing the computer; and
- determining a desired charging power level for the battery pack based on the third temperature value and storing the desired charging power level in a memory device, utilizing the computer.

8. The method of claim 7, further comprising transmitting a message from the computer to a vehicle controller indicating the desired charging power level.

9. The method of claim 7, further comprising determining a desired discharging power level for the battery pack based on the third temperature value, utilizing the computer.

10. The method of claim 9, further comprising transmitting a message from the computer to a vehicle controller indicating the desired discharging power level.

11. The method of claim 7, further comprising determining the third temperature value by adding the first temperature value to the first temperature correlation value, utilizing the computer.

12. A method for determining a temperature value of a battery pack, the method comprising:
- providing the battery pack having an enclosure holding a battery module therein, the battery module having a housing, and first, second, third battery cells disposed in the housing, the first battery cell disposed adjacent to an end of the housing and between the end of the housing and the second battery cell, the second battery cell being disposed between the first battery cell and the third battery cell;
- determining a first temperature value associated with the second battery cell based on a signal from a temperature sensor, utilizing a computer;
- determining a second temperature value associated with a cooling medium flowing into the enclosure of the battery pack, utilizing the computer;
- determining a first difference value indicating a difference between the first and second temperature values, utilizing the computer;
- selecting a first temperature correlation value from a table stored in a memory device based on the first difference value, utilizing the computer; the table having a plurality of difference values and a plurality of temperature correlation values, each difference value of the plurality of difference values being associated with a corresponding temperature correlation value of the plurality of temperature correlation values;

determining a third temperature value indicative of a temperature level of the first battery cell disposed adjacent to the end of the housing based on the first temperature value and the first temperature correlation value, utilizing the computer; and storing the third temperature value in the memory device, utilizing the computer.

\* \* \* \* \*